(12) United States Patent
Bagley

(10) Patent No.: US 9,675,196 B2
(45) Date of Patent: Jun. 13, 2017

(54) SNAP-FIT SCOOP SET

(71) Applicant: Progressive International Corporation, Kent, WA (US)

(72) Inventor: Justin Bagley, Seattle, WA (US)

(73) Assignee: Progressive International Corporation, Kent, WA (US)

( * ) Notice: Subject to any disclaimer, the term of this patent is extended or adjusted under 35 U.S.C. 154(b) by 909 days.

(21) Appl. No.: 13/940,508

(22) Filed: Jul. 12, 2013

(65) Prior Publication Data

US 2014/0013967 A1    Jan. 16, 2014

Related U.S. Application Data

(60) Provisional application No. 61/671,055, filed on Jul. 12, 2012.

(51) Int. Cl.
| | |
|---|---|
| *A47J 23/00* | (2006.01) |
| *A47J 25/00* | (2006.01) |
| *B26D 3/11* | (2006.01) |
| *B26B 3/00* | (2006.01) |
| *A47J 17/02* | (2006.01) |

(52) U.S. Cl.
CPC .............. *A47J 17/02* (2013.01); *B26D 3/11* (2013.01); *A47J 25/00* (2013.01)

(58) Field of Classification Search
CPC ..... B26D 3/11; A23N 7/00; A23N 4/14; A47J 17/02; A47J 25/00; B26B 3/00; B26B 1/00; B26B 1/08; B26B 1/10

USPC ........... 99/538, 540, 541, 545; 30/280, 316; D7/688–695, 393–395, 401.2, 669
See application file for complete search history.

(56) References Cited

U.S. PATENT DOCUMENTS

| | | | |
|---|---|---|---|
| 3,400,591 A * | 9/1968 | Larson ................. | G01F 19/002 30/324 |
| D488,361 S | 4/2004 | Bertulis | |
| 7,716,842 B2 * | 5/2010 | Sumner-Trivisani .. | A47G 21/02 16/422 |
| D646,592 S | 10/2011 | Hood et al. | |
| D646,989 S | 10/2011 | Hood et al. | |
| D682,631 S * | 5/2013 | Kent ............................ | D7/691 |
| 8,806,935 B2 * | 8/2014 | Hood ................... | G01F 19/002 73/426 |
| 2004/0216308 A1 * | 11/2004 | Bertulis ................. | A47J 17/02 30/280 |
| 2012/0198930 A1 * | 8/2012 | Hood ................... | G01F 19/002 73/429 |
| 2012/0273380 A1 * | 11/2012 | Hood ................... | G01F 19/002 206/499 |

* cited by examiner

*Primary Examiner* — Quang D Thanh
*Assistant Examiner* — Hemant Mathew
(74) *Attorney, Agent, or Firm* — Lowe Graham Jones PLLC

(57) ABSTRACT

A snap-fit fruit scoop set includes a first, second, and third fruit scoop, each of the first, second, and third fruit scoops having a corresponding cutting hoop and a handle secured to the cutting hoop. Each of the first, second, and third fruit scoops also includes a locking feature formed on the applicable cutting hoop to enable the first, second, and third fruit scoops to be attached to one another via the locking features.

12 Claims, 5 Drawing Sheets

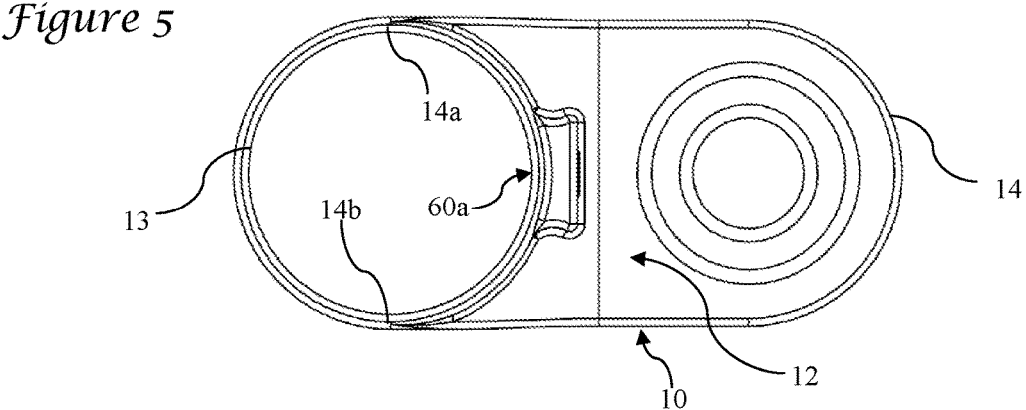
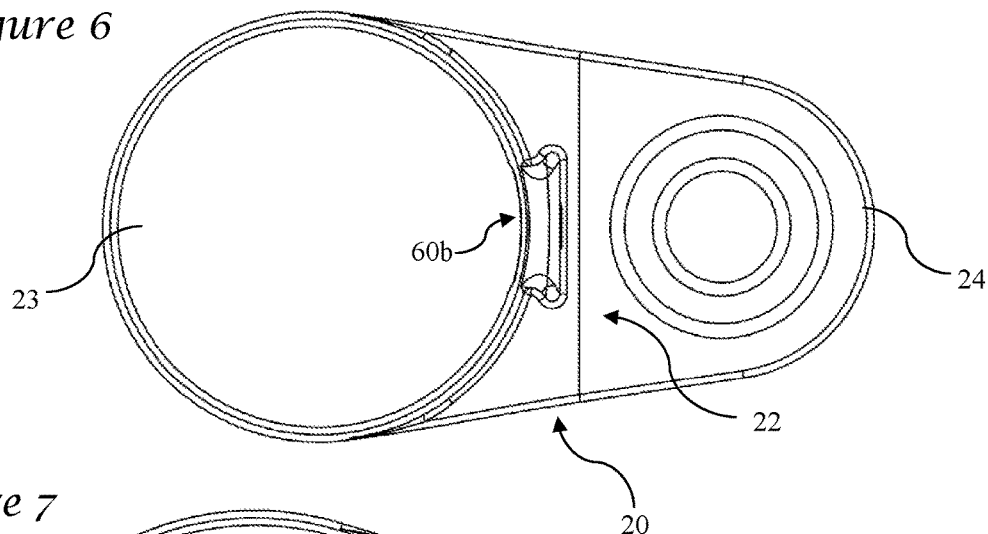
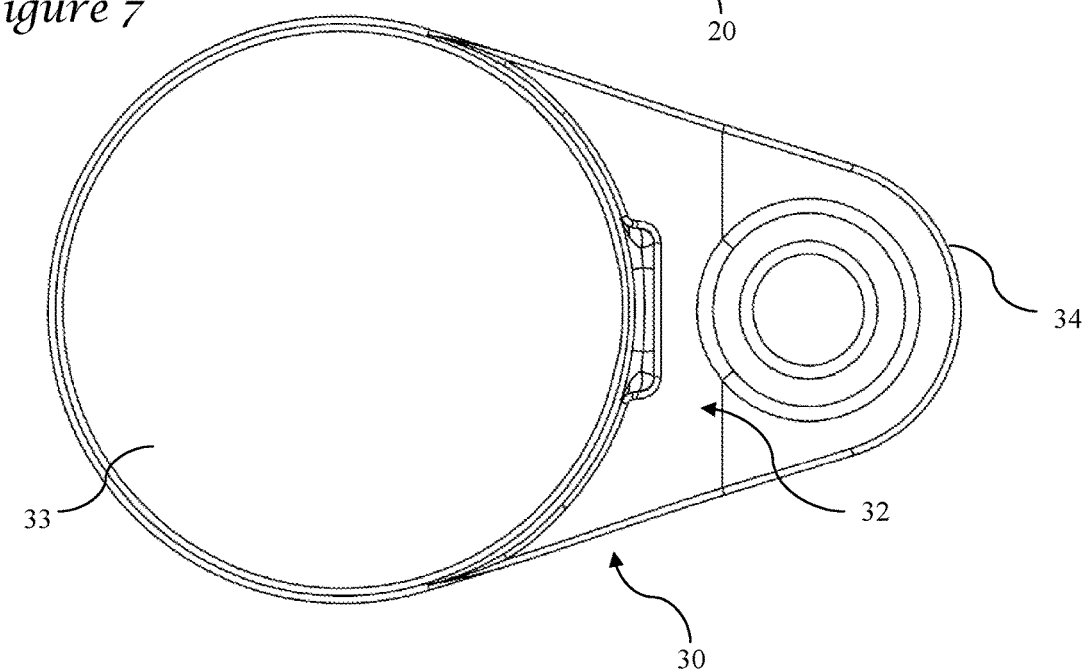

SNAP-FIT SCOOP SET

PRIORITY CLAIM

This application claims the benefit of prior U.S. provisional application Ser. No. 61/671,055 filed Jul. 12, 2012, the contents of which are incorporated by reference.

FIELD OF THE INVENTION

This invention relates generally to devices for removing the fruit of a melon from its rind.

BACKGROUND OF THE INVENTION

Separating the fruit of a melon or similar fruit from its rind can be a challenging task. Some people commonly use a knife for this task, but the rounded nature of the fruit can make a knife awkward and difficult to use. In addition, for many people it can be a dangerous process.

Currently, there are melon scooping tools designed specifically for separating fruit from a melon rind. The melon scoop includes a hoop-shaped cutting blade secured to a handle. While it is an improvement over the use of a knife in many cases, the cutting hoop is also formed in a singular fixed size. For some melons, the curvature of the blade may be just right, while for other melons the blade may be too large (and therefore too flat) or too small (and therefore too sharply curved).

SUMMARY OF THE INVENTION

A preferred fruit scoop in accordance with the present invention is configured to form part of a set of fruit scoops, and in some versions it is employed as a set of two, three, or more fruit scoops in which each of the individual scoops is formed with a cutting hoop of a different diameter. With a set of several fruit scoops having cutting blades of varying diameters, at least one of the scoops within the set should be appropriately sized to accommodate any typical melon.

BRIEF DESCRIPTION OF THE DRAWINGS

Preferred and alternative examples of the present invention are described in detail below with reference to the following drawings:

FIG. 5 is a bottom plan view of a preferred small fruit scoop.

FIG. 6 is a bottom plan view of a preferred medium fruit scoop.

FIG. 7 is a bottom plan view of a preferred large fruit scoop.

DETAILED DESCRIPTION OF THE PREFERRED EMBODIMENT

A preferred fruit scoop in accordance with the present invention is configured to form part of a set of fruit scoops, and in some versions it is employed as a set of two, three, or more fruit scoops in which each of the individual scoops is formed with a cutting hoop of a different diameter. With a set of several fruit scoops having cutting blades of varying diameters, at least one of the scoops within the set should be appropriately sized to accommodate any typical melon.

Figure 1:
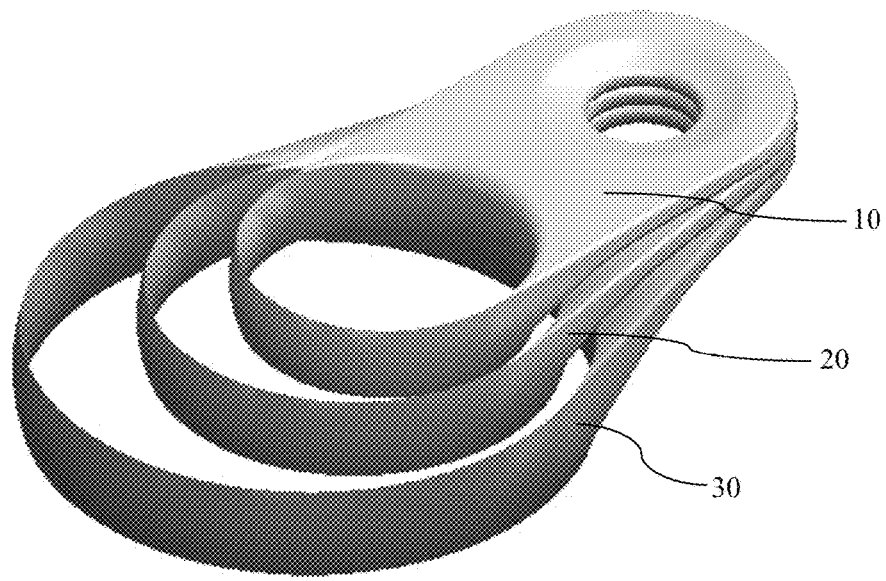
FIG. 1 is a perspective view of a set of three fruit scoops, shown connected together.

In addition to forming a set of differently-sized fruit scoops, in accordance with a preferred version of the invention the scoops are formed with interlocking features to attach the scoops to one another for storage when not in use, as illustrated in FIG. 1. This interlocking feature allows the scoops to be stored together for more convenient access and a better ability to quickly find the scoop of the desired size.

Figure 2:
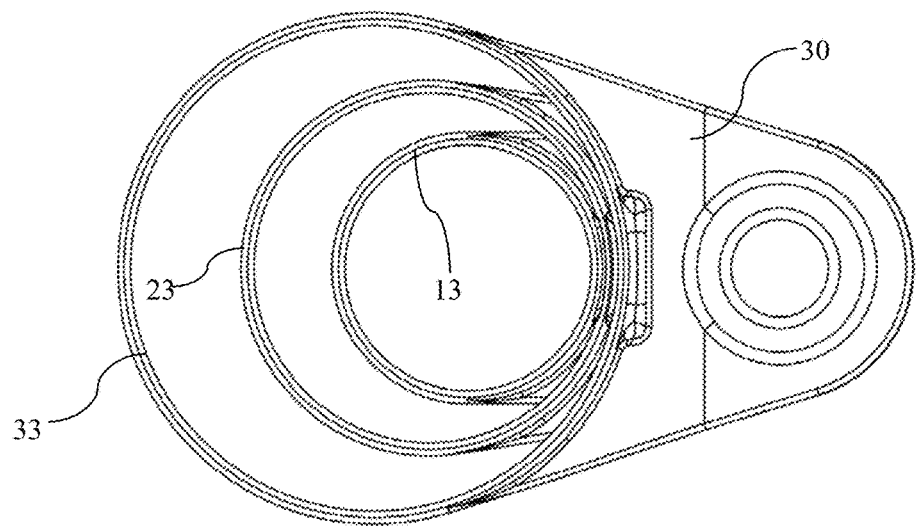
FIG. 2 is a bottom plan view of the fruit scoop set of FIG. 1.
Figure 3:
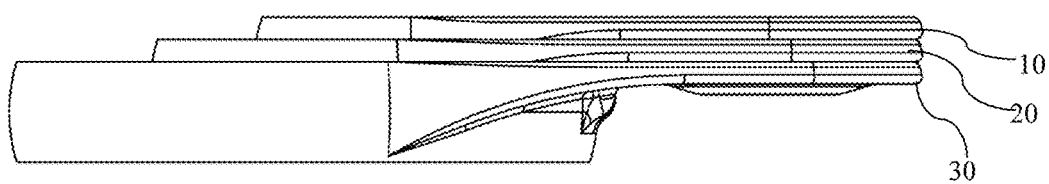
FIG. 3 is a side plan view of the fruit scoop set of FIG. 1.
Figure 4:
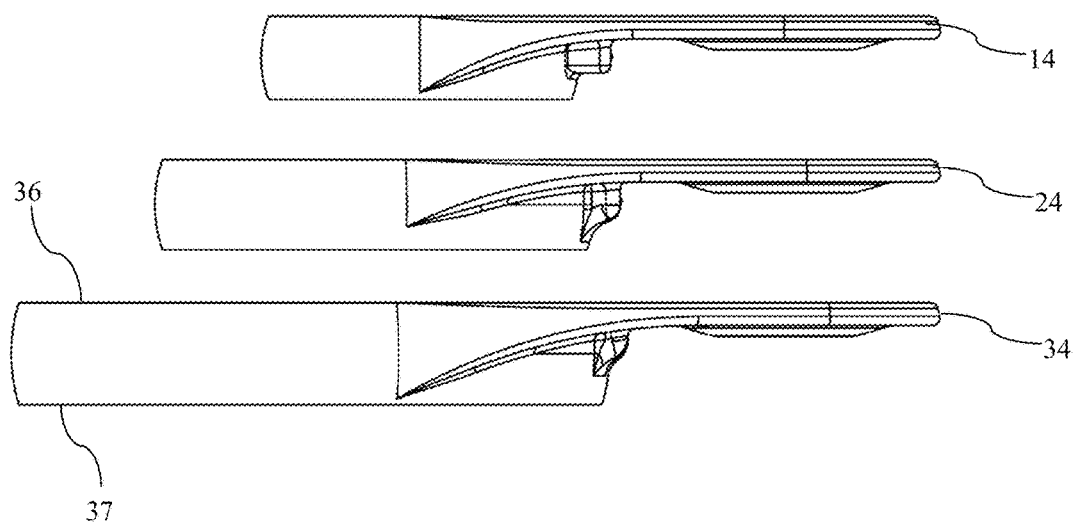
FIG. 4 is an exploded side view of a preferred fruit scoop set.

In accordance with a preferred version of the invention, a fruit scoop set is provided in a set of three differently-sized scoops, including a small scoop (or first scoop) 10, a medium scoop for second scoop) 20, and a large scoop for third scoop) 30. Each of the scoops is formed with a cutting hoop 13, 23, 33 formed in different sizes (that is, a first cutting hoop 13 on the first scoop 10, a second cutting hoop 23 on the second scoop 20, and a third cutting hoop 33 on the third scoop 30), for example as best seen in FIG. 2. The cutting hoops in the illustrated examples are formed as a thin flat blade having at least one sharpened end, preferably oriented toward the top side of the scoop. Optionally, the blade may be sharpened at both the top and bottom edges, for example top edge 36 and bottom edge 37 of a large sized scoop as shown in FIG. 4.

The preferred scoop includes a handle 14, 24, 34 attached to the blade or cutting hoop, illustrated as a first handle 14 on the first scoop 10, a second handle 24 on the second scoop 20, and a third handle 34 on the third scoop 30. In the illustrated example, the handle includes a first end proximate the cutting hoop that is secured about a portion of the perimeter of the cutting hoop. For improved rigidity, the handle is attached to and extends from the a portion of the perimeter forming approximately as much as 180 degrees of the cutting hoop, and preferably at least along an arc of at least 120 degrees of the cutting hoop. Thus, for example, a handle may connect to the cutting hoop at substantially diametrically opposite locations 14a, 14b, such as shown in FIG. 5.

In the versions as shown, the entire scoop, including the handle and the blade, are formed integrally from a rigid or semi-rigid plastic material. In other versions, the scoop may be formed from metal or other suitable materials.

Figure 9:
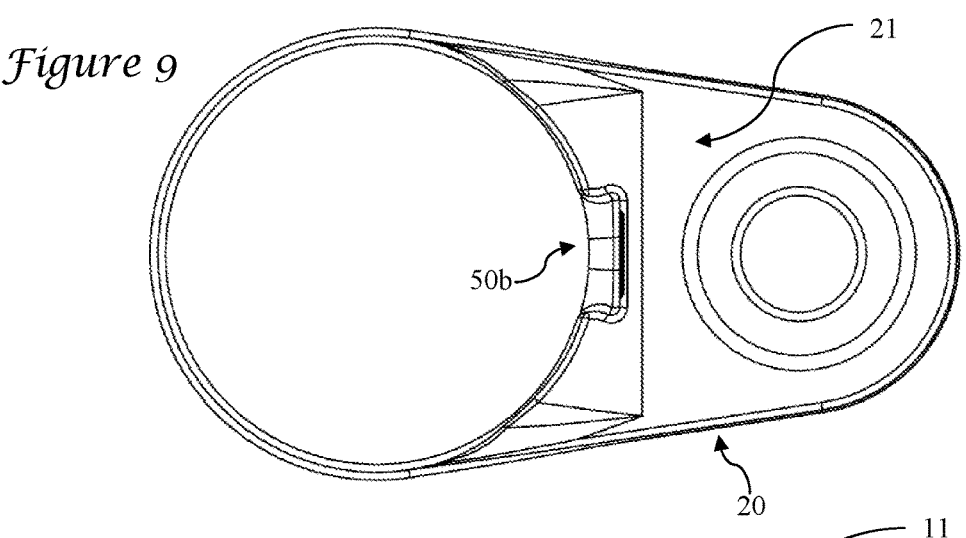
FIG. 9 is a top plan view of a preferred medium fruit scoop.
Figure 10:
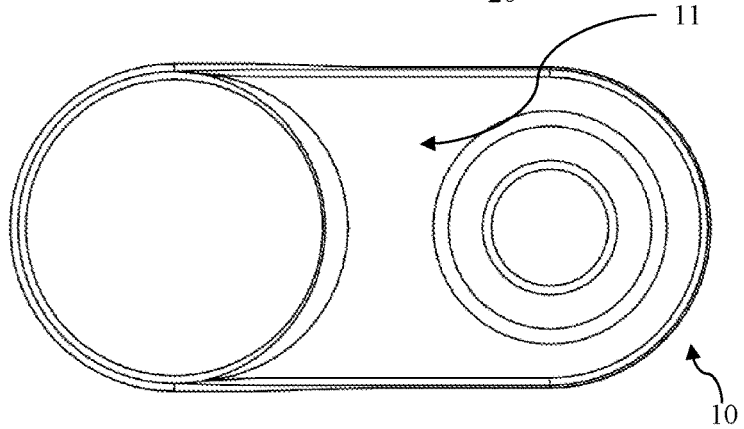
FIG. 10 is a top plan view of a preferred small fruit scoop.

The handles include an upper side 11, 21, 31 (see FIGS. 8-10) and a lower side 12, 22, 32 (see FIGS. 6-7), generally forming a wide, flat flange-shaped handle. In the case of the smallest scoop 10, the handle and cutting hoop generally form an oblong shape overall, with the length of the handle being approximately equal to or only slightly greater than the diameter of the cutting hoop. The handle of the middle sized scoop preferably includes a distal end having a radius substantially equal to the terminating radius of the smallest scoop, with the perimeter of the handle flaring outwardly from the distal end toward the proximal end where it mates with the cutting hoop. The handle of the largest hoop is preferably formed with a similar shape, thereby resulting in a larger flared handle shape.

Figure 12:
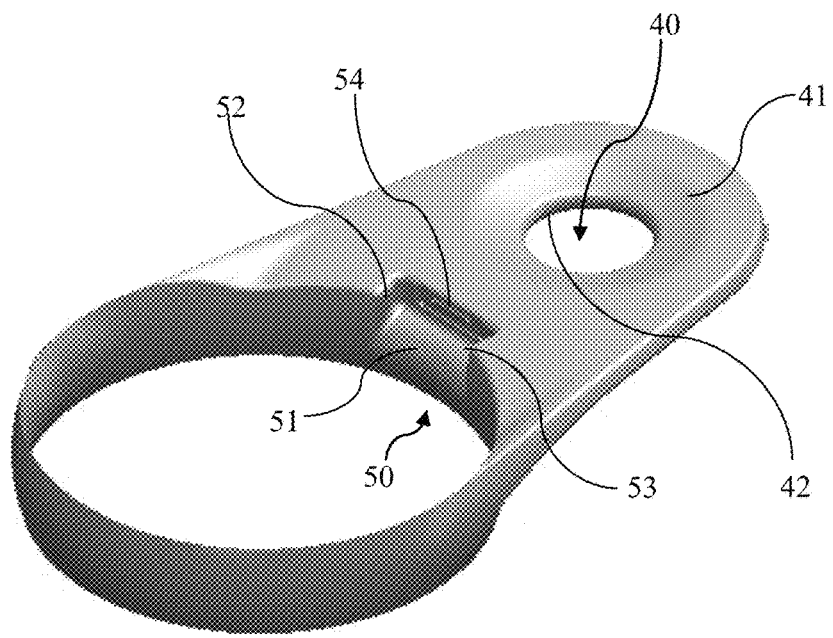
FIG. 12 is a top perspective view of a preferred fruit scoop.

At the distal end, each handle preferably includes a bore 40, as seen in FIG. 12, and in the illustrated version the bore is centrally located toward the end of the handle. A shallow depression or concavity 41 is formed about the periphery of the central bore at the upper surface of the handle, providing a seat for receiving a similarly shaped mating convex shape formed at the lower surface of an adjacent mating scoop. Along the interior of the bore 40, the concavity 41 terminates in a central flange 42. In the preferred example, the central flange is formed as a short upright cylinder having vertical sidewalls but an open top and bottom.

In the case of a set of fruit scoops, each handle includes a complementary-shaped bore, concavity, and flange such that the flange from a first handle can be seated within a bore and flange of a second handle. Most preferably, the bores and flanges are configured such that the smallest one fits within an intermediate one and the intermediate one fits within the largest one. In some versions the flanges and bores are sized and configured to provide a snug friction fit between mating handles to help to hold the handles of a pair of scoops together.

Figure 11:
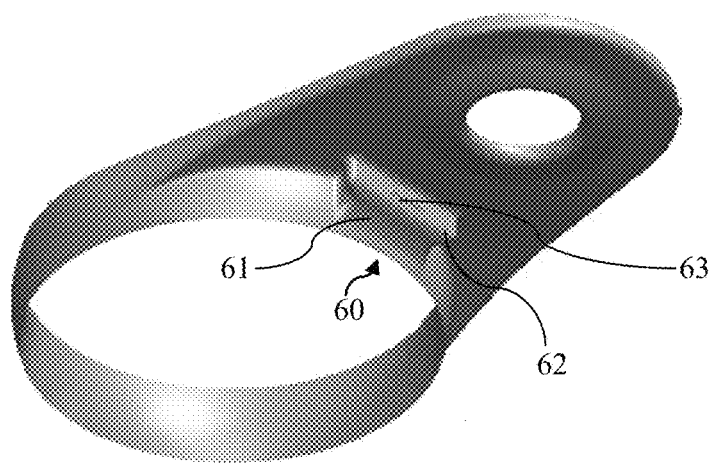
FIG. 11 is a bottom perspective view of a preferred fruit scoop.

Each of the fruit scoops further preferably includes a mating locking feature, including an upper locking feature 50 formed on an upper side of a fruit scoop (see FIG. 12) and a lower locking feature 60 formed on a lower side of a fruit scoop (see FIG. 11). In a preferred version as illustrated, the upper locking feature is oriented as a female configuration to receive the lower locking feature oriented in a male configuration. In other versions the two configurations may be reversed, or may be formed to interact with one another without having a male-female configuration.

In example illustrated in FIG. 12, the upper locking feature is formed along an upper side of a fruit scoop, preferably positioned on an inner surface of the cutting hoop at the juncture of the cutting hoop and the handle. This female locking feature includes a lower saddle 51 that transitions from the blade to the handle. The saddle flares vertically from a lower portion of the cutting hoop toward an upper portion of the cutting hoop.

The upper locking feature further includes a vertical channel formed generally as a C-shape with the open end of the C opening outward toward the saddle. A pair of vertical shoulders 52, 53 are formed along each side of the opening. Along a back sidewall of the vertical channel (at the inner center of the C-shape) a horizontal tab 54 is formed.

Figure 8:
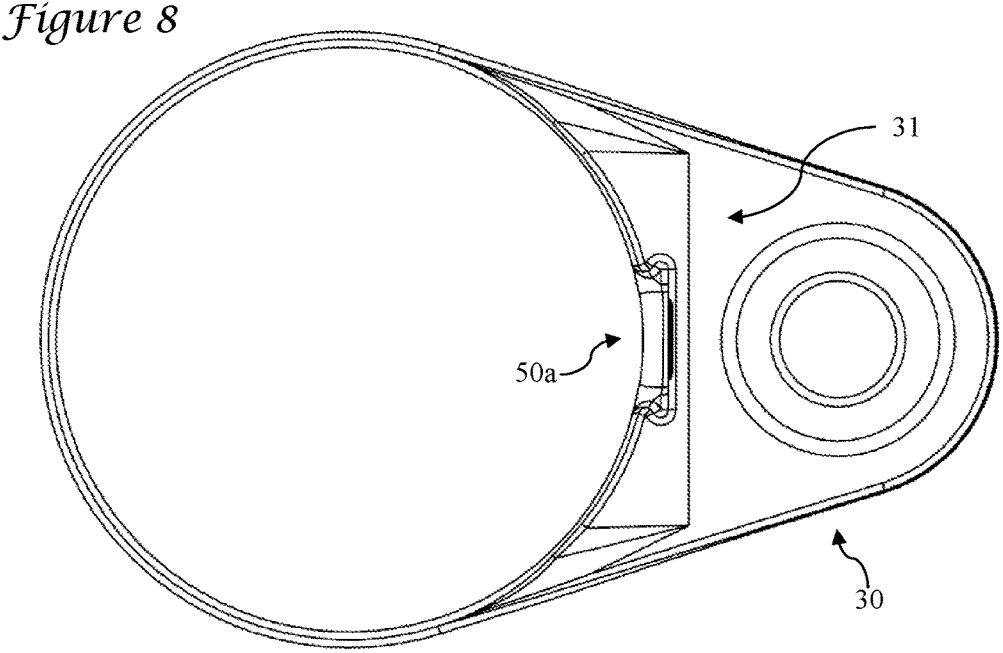
FIG. 8 is a top plan view of a preferred large fruit scoop.

A lower locking feature 60 as illustrated in FIG. 11 is provided on a lower surface of a second fruit scoop in order to mate with the first locking feature. Most preferably, the lower locking feature is generally formed in a T-shape, with the horizontal portion of the T being received within the inner portion of the C-shape in order to join the two locking features together. With reference to the version as illustrated, the lower locking feature includes a second saddle 61 sweeping upward, away from a lower surface of a cutting blade. The second saddle terminates in a horizontal bar 62 sized and configured to be received within the vertical channel defined between the two shoulders 52, 53 of the first fruit scoop. A second horizontal tab 63 is formed on a surface of the horizontal bar 62, preferably centrally located and positioned to fit beneath the first horizontal tab formed in the channel as described above. As best seen in FIG. 5, the first fruit scoop 10 includes a first locking feature 60a. As best seen in FIG. 6, the second fruit scoop 20 includes a second locking feature 60b. As best seen in FIG. 8, the third fruit scoop 30 includes a third locking feature 50a. As illustrated, the second locking feature of the second fruit scoop 20 further includes both a lower locking feature (60b, see FIG. 6) and an upper locking feature (50b, see FIG. 6).

In order to connect a first fruit scoop to a second fruit scoop, the two are positioned adjacent one another with one above the other, with the vertical flange at the distal end of a first handle being inserted into the central bore of a second handle. The two locking features are also positioned adjacent one another, with the horizontal bar of one fruit scoop being inserted into the horizontal channel of another fruit scoop. Preferably the bar and channel are sized such that the bar is snugly and frictionally retained within the channel. In addition, the horizontal tab of the upper fruit scoop is positioned to slide over the top of the horizontal tab of the lower fruit scoop, whereby the horizontal tab of the upper fruit scoop will be positioned beneath the horizontal tab of the lower fruit scoop when it is pressed down into a locked position.

In the illustrated version, three different fruit scoops form a set. Most preferably, the smallest fruit scoop is configured to be positioned at the top when joined together, with the largest one on the bottom. Thus, in this preferred configuration the top scoop includes a lower-surface locking feature; the middle scoop includes both upper and lower surface locking features; and the bottom scoop includes only an upper surface locking feature.

In other versions of the invention, all scoops may be configured with both upper and lower surface locking features allowing them to be positioned in different orientations or further allowing more than three scoops to form a set.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A snap-fit fruit scoop set, comprising:
  a first fruit scoop having a first cutting hoop and a first handle secured to the first cutting hoop, the first fruit scoop further having a first locking feature formed on the first cutting hoop;
  a second fruit scoop having a second cutting hoop and a second handle secured to the second cutting hoop, the second fruit scoop further having a second locking feature formed on the second cutting hoop;
  a third fruit scoop having a third cutting hoop and a third handle secured to the third cutting hoop, the third fruit scoop further having a third locking feature formed on the third cutting hoop;
  the first cutting hoop, the second cutting hoop, and the third cutting hoop each having a diameter that is different from one another;
  the first fruit scoop, the second fruit scoop, and the third fruit scoop being removably secured to one another by joining the first locking feature to the second locking feature and the second locking feature to the third locking feature;
  whereby the first cutting hoop, the second cutting hoop, and the third cutting hoop are nested concentrically when the first locking feature is joined to the second locking feature and the second locking feature is joined to the third locking feature.

2. The snap-fit fruit scoop set of claim 1, wherein:
the first locking feature further comprises a first lower surface positioned on an outer perimeter of the first cutting hoop and forming a first horizontal bar;
the second locking feature comprises a first upper surface positioned on an interior surface of the second cutting hoop and forming a first channel bounded by a pair of shoulders;
whereby the first horizontal bar is received within the first channel to secure the first fruit scoop to the second fruit scoop.

3. The snap-fit fruit scoop set of claim 2, wherein:
the second locking feature further comprises a second lower surface extending from an outer perimeter of the second cutting hoop and forming a second horizontal bar;
the third locking feature comprises a second upper surface extending from an interior surface of the third cutting hoop and forming a second channel bounded by a pair of shoulders;
whereby the second horizontal bar is received within the second channel to secure the second fruit scoop to the third fruit scoop.

4. The snap-fit fruit scoop set of claim 3, wherein:
the first fruit scoop further includes a downwardly extending flange formed on the first handle; and
the second fruit scoop further includes a seat formed on the second handle;
whereby the flange is received in the seat to further secure the first fruit scoop to the second fruit scoop.

5. A snap-fit fruit scoop set, comprising:
a first fruit scoop comprising:
  a first cutting hoop having a first diameter;
  a first handle secured to the first cutting hoop, the first handle having an upper side and a lower side, the first cutting hoop extending downward and away from the lower side; and
  a first locking feature positioned on the first cutting hoop;
a second fruit scoop comprising:
  a second cutting hoop having a second diameter in which the second diameter is larger than the first diameter;
  a second handle secured to the second cutting hoop, the second handle having an upper side and a lower side, the second cutting hoop extending downward and away from the lower side; and
  a second locking feature positioned on the second cutting hoop;
a third fruit scoop comprising:
  a third cutting hoop having a third diameter in which the third diameter is larger than the second diameter;
  a third handle secured to the third cutting hoop, the third handle having an upper side and a lower side, the third cutting hoop extending downward and away from the lower side; and
  a third locking feature positioned on the third cutting hoop;
the first fruit scoop, the second fruit scoop, and the third fruit scoop being removably secured to one another by joining the first locking feature to the second locking feature and the second locking feature to the third locking feature;
whereby the first cutting hoop, the second cutting hoop, and the third cutting hoop are nested concentrically when the first locking feature is joined to the second locking feature and the second locking feature is joined to the third locking feature.

6. The snap-fit fruit scoop set of claim 5, wherein:
the first locking feature further comprises a first horizontal bar;
the second locking feature comprises a first channel and a second horizontal bar; and
the third locking feature comprises a second channel;
whereby the first horizontal bar is received within the first channel to secure the first fruit scoop to the second fruit scoop, and the second horizontal bar is received within the second channel to secure the second fruit scoop to the third fruit scoop.

7. The snap-fit fruit scoop set of claim 6, wherein:
the first fruit scoop further includes a downwardly extending flange formed on the first handle; and
the second fruit scoop further includes a seat formed on the second handle;
whereby the flange is received in the seat to further secure the first fruit scoop to the second fruit scoop.

8. The snap-fit fruit scoop set of claim 7, wherein the downwardly extending flange is formed along a rim of a bore formed in the first handle.

9. The snap-fit fruit scoop set of claim 6, wherein:
the first locking feature is formed at a junction of the first handle and the first cutting hoop;
the second locking feature is formed at a junction of the second handle and the second cutting hoop; and
the third locking feature is formed at a junction of the third handle and the third cutting hoop.

10. The snap-fit fruit scoop set of claim 9, wherein the first handle joins to the first cutting hoop at a first position on the cutting hoop and a second position diametrically opposite the first position.

11. The snap-fit fruit scoop set of claim 9, wherein the first locking feature is formed as a saddle that flares vertically as the saddle transitions from a lower portion of the first cutting hoop to an upper portion of the first cutting hoop.

12. The snap-fit fruit scoop set of claim 11, wherein the first locking feature is further formed with a channel having a pair of inward-directed shoulders, and further wherein the second locking feature is formed with a T-shape, the horizontal portion of the T-shaped locking feature being removably receivable within the channel, wherein the inward-directed shoulders retain the second locking feature within the first locking feature.

\* \* \* \* \*